US008522643B2

(12) United States Patent
Dorn et al.

(10) Patent No.: US 8,522,643 B2

(45) Date of Patent: Sep. 3, 2013

(54) CAM FOLLOWER

(75) Inventors: Stefan Dorn, Hollfeld (DE); Norbert Geyer, Hoechstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/197,170

(22) Filed: Aug. 3, 2011

(65) Prior Publication Data

US 2012/0031223 A1 Feb. 9, 2012

(30) Foreign Application Priority Data

Aug. 3, 2010 (DE) ........................ 10 2010 033 120

(51) Int. Cl.
*F16H 53/06* (2006.01)
*F16H 53/00* (2006.01)

(52) U.S. Cl.
USPC ................................. 74/569; 74/559; 74/567

(58) Field of Classification Search
USPC ..................... 74/569, 559; 123/90.39, 90.48, 123/90.5; 384/58, 449, 549, 568
See application file for complete search history.

(56) References Cited

U.S. PATENT DOCUMENTS

| | | | | |
|---|---|---|---|---|
| 5,273,005 | A * | 12/1993 | Philo et al. | 123/90.5 |
| 5,379,730 | A * | 1/1995 | Schaeffler | 123/90.55 |
| 6,776,532 | B2 * | 8/2004 | Mochizuki | 384/572 |
| 7,021,260 | B2 * | 4/2006 | Abe | 123/90.39 |
| 7,387,098 | B2 * | 6/2008 | Waseda et al. | 123/90.51 |
| 7,793,583 | B2 * | 9/2010 | Radinger et al. | 92/129 |
| 8,061,320 | B2 * | 11/2011 | Meisborn | 123/90.48 |
| 8,104,441 | B2 * | 1/2012 | Moeck et al. | 123/90.39 |
| 2008/0034916 | A1 * | 2/2008 | Kadokawa et al. | 74/569 |
| 2008/0190237 | A1 * | 8/2008 | Radinger et al. | 74/569 |
| 2011/0088506 | A1 * | 4/2011 | Oishi et al. | 74/569 |

FOREIGN PATENT DOCUMENTS

| | | |
|---|---|---|
| DE | 103 54 683 A1 | 6/2005 |
| DE | 10 2005 047 234 A1 | 4/2007 |

* cited by examiner

*Primary Examiner* — Thomas R Hannon
*Assistant Examiner* — Kashif Mohammed
(74) *Attorney, Agent, or Firm* — Lucas & Mercanti, LLP

(57) ABSTRACT

A cam follower for a high-pressure fuel pump of an internal combustion engine, which has a cam roller that is accommodated in a pocket of the cam follower. The cam roller has a bore and the bore is mounted by on a pin which is seated at the ends in receptacles of opposite walls of the pocket. The cam roller runs with its end sides directly in front of the walls. Each end side of the cam roller takes the form of an outer surface of a spherical zone, and each wall is smooth and straight, at least in the region of its run-on piece at the respective end side of the cam roller.

8 Claims, 3 Drawing Sheets

-prior art-

CAM FOLLOWER

CROSS-REFERENCE TO RELATED APPLICATION

This application claims the priority of DE 10 2010 033 120.1 filed Aug. 3, 2010, which is incorporated by reference herein.

BACKGROUND OF THE INVENTION

The invention relates to a cam follower for a high-pressure fuel pump or for a valve drive in each case of an internal combustion engine with quantity or quality regulation, having a cam roller which is accommodated in a pocket of the cam follower, which cam roller is mounted by means of its bore on a pin which is seated at the ends in receptacles of opposite walls of the pocket, the cam roller running with its end sides directly in front of said walls.

A cam follower of said type emerges from DE 10 2005 047 234 A1. Said cam follower is designed as a cup-shaped tappet and serves to exert a periodic loading on a pump piston of a fuel pump. A further cam follower is described in DE 103 54 683 A1. Said cam follower takes the form of a rocker arm and is used for exerting a loading on a gas exchange valve in a valve drive.

In each case one roller mounted on a pin serves as a cam opposing member. Said roller runs via its end sides, which are planar with the exception of a structurally necessary chamfer in the transition region to the bore and to an outer surface of the cam roller, against flat walls of the pocket. On account of tolerances and/or the unfavorable summing thereof, an edge region of the end side to the outer surface of the cam roller may come into contact, during operation, with the corresponding wall of the pocket. In addition to the wear in the region of direct contact, the cam roller is braked, which results in slippage in the bearing and at the cam contact area. It is attempted in the prior art to counteract the undesirably high wear by means of very high production accuracy, applied coatings and/or improved lubrication.

SUMMARY OF THE INVENTION

It is an object of the invention to provide a cam follower of the type described in the introduction which, however, does not have the stated wear problems.

According to the invention, said object is achieved in that each end side of the cam roller takes substantially the form of an outer surface of a spherical zone, wherein each wall is of smooth-walled, straight design at least in the region of its run-on piece at the respective end side of the cam roller.

An alternative design to this is the subject matter of the further independent claim 3, according to which each end side of the cam roller is planar, and wherein the run-on piece of said end sides on the wall is formed as a spherical section bulged inward in the direction of the cam roller.

If appropriate, it is also possible for both end sides to simultaneously take the form of spherical sections bulged toward one another, or similar designs.

Owing to this solution which can be realized very cheaply in production terms, the stated wear problems are eliminated and the service life of the cam follower is increased. The additional wear protection measures described in the introduction are not required but may be applied as before. If appropriate, the tolerancing accuracy may be reduced.

If the cam roller assumes an undesired oblique position, a much “less severe” contact region arises. So-called “edge loads” are eliminated by the measures according to the invention. On account of the planar or flattened radially inner section, high-wear edge contact at the transition region in the bore is simultaneously prevented.

It goes without saying that chamfers [bevels or rounded portions] are still provided at the transition regions from the end side to the bore and to the outer surface, because these are structurally necessary.

A further subclaim relates to simple measures for mounting the cam roller on the pin. Either a rolling bearing, such as a needle-roller bearing, or a plain bearing is used. The cam contact area may be lubricated by means of targeted spraying of oil and/or by means of oil mist. The pin may be fastened by being caulked, riveted, pressed in, etc. Depending on the application, it is also conceivable and provided for said pin to be mounted in a floating fashion.

It is also proposed, in the case of a design of the cam follower as a cup-shaped tappet or roller tappet (push rod loading), that the receptacles for the pins be provided in longitudinal flattened portions which are recessed from the cylindrical skirt, such that a flat, inner abutment surface for the end of the pin is generated in a simple manner. If appropriate, said flattened portion may however also be generated retroactively, for example by cutting.

Alternatively, the cam follower may also take the form of a lever such as a rocker arm, oscillating arm or tilt lever, between the side walls of which the cam roller is installed.

BRIEF DESCRIPTION OF THE DRAWINGS

The invention will be explained on the basis of the drawing, in which.

DETAILED DESCRIPTION OF THE INVENTION

Figure 1:
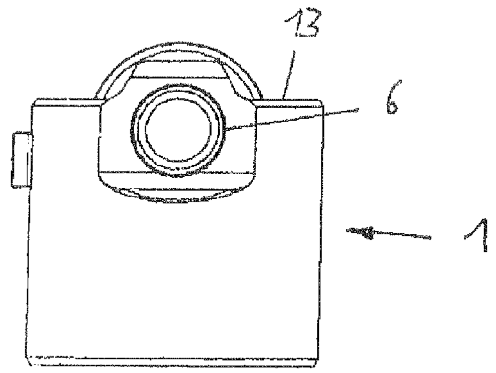
FIGS. 1-4 show a cam follower for a high-pressure fuel pump, designed in this case as a roller tappet, in two side views and two sectional views.
Figure 2:
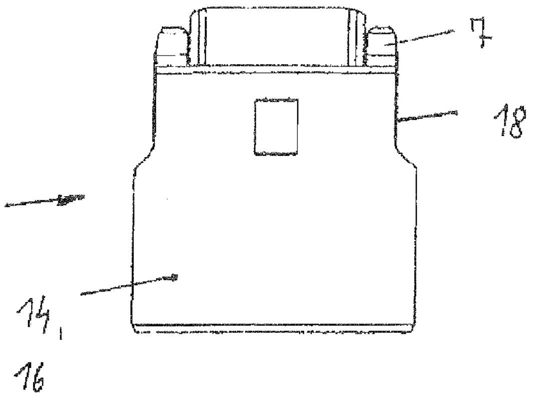
Figure 3:
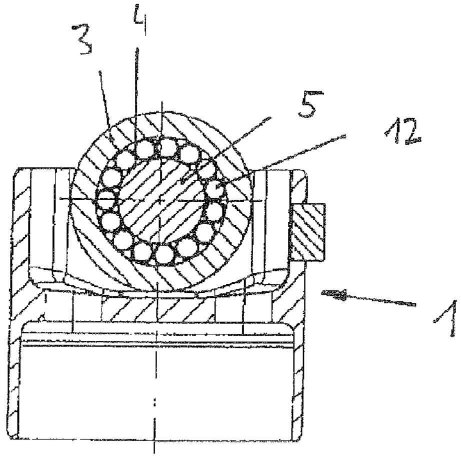
Figure 4:
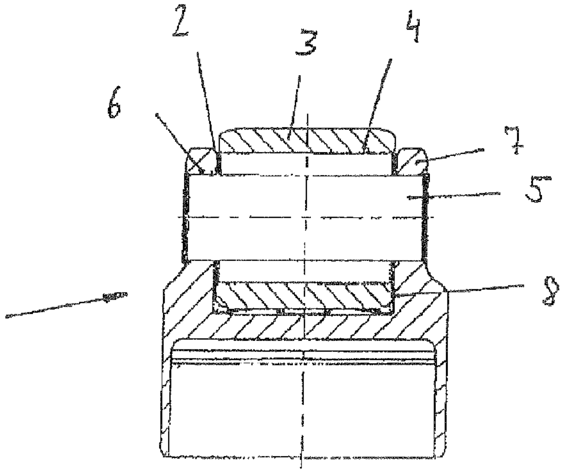

FIGS. 1-4 show a cam follower 1, designed as a cup-shaped tappet, for a high-pressure fuel pump of an internal combustion engine. The cam follower 1 is composed of a hollow cylindrical skirt 14, from the drive-side edge 13 of which extends a pocket 2. A cam roller 3 is accommodated in said pocket. Said cam roller has a bore 4 with a rolling bearing 12 by means of which the cam roller 3 runs on a pin 5. The pin 5 is seated at the ends in receptacles 6 of opposite walls 7 of the pocket 2. The walls 7 are formed as diametrically opposite recessed longitudinal flattened portions 18. The cam roller 3 runs with its end sides 8 directly in front of and/or against the walls 7.

Figure 6:
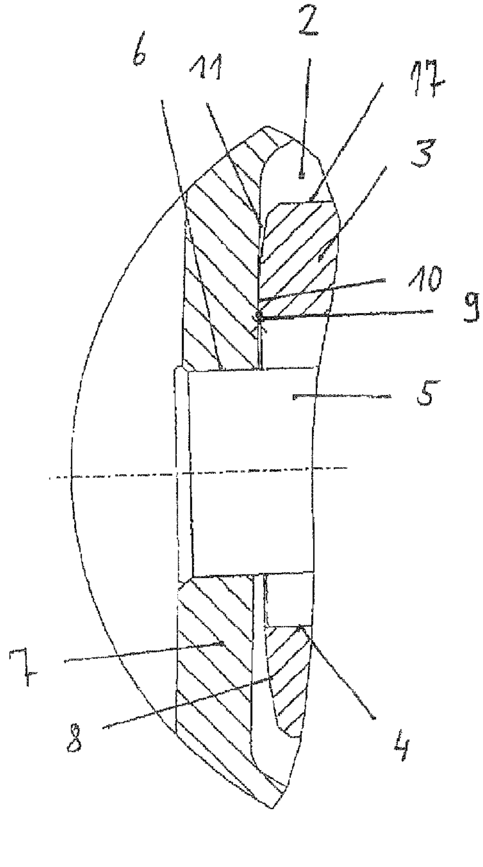
FIG. 6 shows a greatly enlarged partial section in the region of the mounting of the pin in the wall of the cam follower.

As can be most clearly seen in this context from FIG. 6, each end side 8 of the cam roller 3 is formed as an outer surface of a spherical zone. In other words, said end side 8 is of crowned or domed design. At the same time, each wall 7 has a smooth-walled, plain profile in the region of its run-on piece 11, i.e., the portion of the wall 7 on which the cam roller 3 can run. A section 10, which directly adjoins an annular edge 9 in the bore 4, of the respective end side 8 of the cam roller 3 is, however, of planar design.

If the cam roller 3 runs "obliquely" with one of its end sides 8 against the opposite wall 7, then the contact region in the edge section of the end side 8 to the outer casing 17 is made much "less severe". The wear problems described in the introduction are no longer to be expected. At the same time, a sharp-edged transition region of the end side 8 to the bore 4 is avoided as a result of the fact that the end side 8 is initially of planar form radially at the inside.

Figure 5:
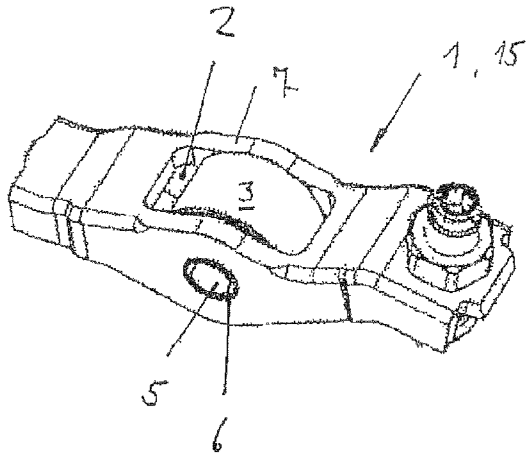
FIG. 5 shows a three-dimensional view of a cam follower for a valve drive, designed in this case as a rocker arm.

FIG. 5 shows a further variant of a cam follower 1 designed according to the invention. Here, said cam follower takes the form of a lever 15 (rocker arm), between the walls 7 of which is held the cam roller 3 which is mounted on the pin 5. The lever 15 has a downwardly open U-shaped profile, wherein said lever may also have an upwardly open U-shaped profile or an H-shaped profile. The lever 15 may also be composed of solid material.

Figure 6A:
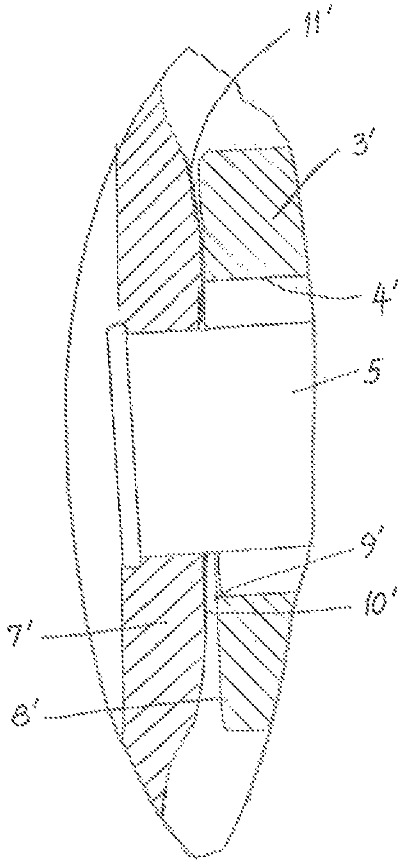
FIG. 6A shows a further embodiment of the present invention in a view corresponding to that of FIG. 6.

FIG. 6A shows a further embodiment in which each end side 8' of the cam roller 3' is planar and the run-on piece 11' of the end sides of the wall 7' is formed as a spherical section. The section 10' is flattened and is disposed radially outward from the annular edge 9' of the bore 4' of the cam roller 3'.

Figure 7:
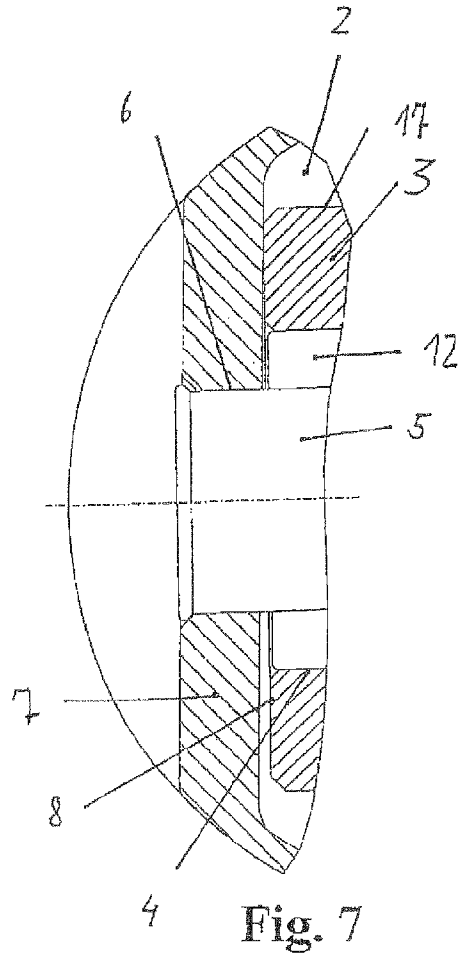
FIG. 7 shows a partial section similar to that mentioned above, but with a solution according to the prior art.

Finally, FIG. 7 is representative of solutions realized previously in cam follower design, having end sides 8, which are planar with the exception of chamfers, on the respective cam roller 3, which end sides run against smooth-walled, straight walls 7. The illustration shows an oblique position of the cam roller 3 which, in the relatively sharp-edged transition region of the end side 8 thereof to the outer surface 17, runs with high wear against the wall 7.

LIST OF REFERENCE NUMERALS

1) Cam Follower
2) Pocket
3) Cam Roller
4) Bore
5) Pin
6) Receptacle
7) Wall
8) End Side
9) Annular Edge
10) Section
11) Run-on Piece (Wall)
12) Rolling Bearing
13) Edge
14) Skirt
15) Lever
16) Tappet
17) Outer Surface
18) Longitudinal Flattened Portion

The invention claimed is:

1. A cam follower for a high-pressure fuel pump or for a valve drive of an internal combustion engine with quantity or quality regulation, comprising:

a housing having opposing sidewalls, each having a bore;

a pocket formed between the opposing sidewalls of the housing, the pocket having inner opposing sidewalls;

a cam roller, mounted in the pocket, the cam roller having a bore and end side faces that face the inner opposing side walls of the pocket; and a pin, which has ends, seated in the bore of the opposing sidewalls and the pin passing through the bore of the cam roller to mount the cam roller in the pocket and the cam roller running in the pocket on rolling bearing rollers such that the end side faces of the cam roller are directly next to the inner sidewalls of the pocket, wherein one of:

the end side faces of the cam roller are straight surfaces and the inner sidewalls of the pocket are substantially spherical outer surfaces; and the end side faces of the cam roller are substantially spherical surfaces and the inner sidewalls of the pocket are straight surfaces, such that contact between the cam roller and the inner sidewalls of the pocket occurs at the substantially spherical outer surfaces when the cam follower runs obliquely, wherein the cam roller is an outer cylindrical piece that rolls around the pin on the rolling bearing rollers.

2. The cam follower according to claim 1, wherein the end side faces of the can roller comprise the substantially spherical outer surfaces, the bore of the cam roller has an annular edge, and a section directly adjoining the annular edge of the bore on each of the end side faces is planar.

3. The cam follower according to claim 1, wherein each of the end side faces of the cam roller is planar, and the inner opposing sidewalls of the pocket are each formed as the substantially spherical outer surfaces.

4. The cam follower according to claim 3, wherein the inner opposing sidewalls each have a head region that is flattened, the bore in the sidewall has an annular edge, and the head region has an edge that extends radially further than the annular edge of the bore of the sidewall.

5. The cam follower according to claim 1, wherein the housing has a skirt and the housing is a cup-shaped tappet such that the sidewalls are formed as recessed longitudinal flattened portions which extend from a cam-side edge of the skirt of the housing.

6. The cam follower according to claim 1, wherein the cam follower is a roller tappet for acting on a push rod or a lever for the valve drive.

7. The cam follower according to claim 6, wherein the lever is a rocker arm, oscillating arm or tilt lever.

8. The cam follower according to claim 1, wherein the cam roller projects in sections beyond the pocket.

* * * * *